United States Patent [19]
Edesess

[11] Patent Number: 5,884,287
[45] Date of Patent: Mar. 16, 1999

[54] SYSTEM AND METHOD FOR GENERATING AND DISPLAYING RISK AND RETURN IN AN INVESTMENT PORTFOLIO

[75] Inventor: Michael Edesess, Evergreen, Colo.

[73] Assignee: LFG, Inc., Malvern, Pa.

[21] Appl. No.: 843,027

[22] Filed: Apr. 11, 1997

Related U.S. Application Data

[60] Provisional application No. 60/015,420 Apr. 12, 1996.

[51] Int. Cl.[6] .................................................. G06F 17/60
[52] U.S. Cl. ............................................................. 705/36
[58] Field of Search ........................................ 705/36, 35

[56] References Cited

U.S. PATENT DOCUMENTS

| | | | |
|---|---|---|---|
| 4,839,804 | 6/1989 | Roberts | 364/408 |
| 4,953,085 | 8/1990 | Atkins | 364/408 |
| 5,132,899 | 7/1992 | Fox | 364/408 |
| 5,148,365 | 9/1992 | Dembo | 703/36 |
| 5,222,019 | 6/1993 | Yoshino | 364/408 |
| 5,237,500 | 8/1993 | Perg | 364/408 |
| 5,471,575 | 11/1995 | Giansante | 395/144 |
| 5,563,783 | 10/1996 | Stolfo | 364/408 |

OTHER PUBLICATIONS

William N. Goetzman, "An Introduction to Investment Theory", Yale School of Management, Apr. 9, 1997, Class Notes.

Keyes, Jessica. "Expert Allocator: Tools for portfolio optimization." Pension Management, pp. 44–46, May 1996.

Putnam, Bluford. "Asset allocation—one step at a time." Global Investor, No. 100, pp. 67–69, Mar. 1997.

"Ibboston Associates offers asset allocation program." Bank Mutual Fund Report, vol. 4 No. 11, Jun. 1994.

Edessess, Michael et al. "Scenario forecasting: Necessity, not choice." Journal of Portfolio Management, vol. 6 No. 3, pp. 10–15, Sprg 1980.

"Keeping up with technology: the 1991 software update" Trusts & Estates, pp. 34–67, Jun. 1991.

Paroush, Jacob. "Risk and wealth effects on efficient portfolio." Metroeconomics, vol. 26, No. 1–3, pp. 86–96, 1974.

Voros, J. "Portfolio analysis—an analytic derivation of the efficient portfolio frontier." European Journal of Operations Research, vol. 23, No. 3, pp. 294–300, Mar. 1986.

*Primary Examiner*—Allen R. MacDonald
*Assistant Examiner*—Michele Stuckey Crecca
*Attorney, Agent, or Firm*—Duane, Morris & Heckscher LLP

[57] ABSTRACT

The present invention is a computer-implemented system and method to create an optimal investment plan given wealth goals stated in probabilistic form, and to display the resulting probability distributions of wealth accumulations at future times where the method provides inputs for entering and storing in a computer target and fallback scenarios and required probabilities, computes rate of return values responsive to the user input, generates an efficient portfolio array, computes probabilities for the efficient portfolio array related to the rate of return values, iteratively compares the array probabilities so that the target and fallback scenario probabilities are satisfied and an optimum efficient portfolio is selected and then provides a graphical representation of the selected efficient portfolio.

14 Claims, 7 Drawing Sheets

SYSTEM AND METHOD FOR GENERATING AND DISPLAYING RISK AND RETURN IN AN INVESTMENT PORTFOLIO

CROSS REFERENCE TO RELATED APPLICATION

This application claims the benefit of U.S. provisional application No. 60/015,420, filed Apr. 12, 1996.

FIELD OF THE INVENTION

The present invention relates to a computer-implemented system and method for providing investment optimization and characterization and, more particularly to such a process in which future financial goals can be displayed probabilistically in dollar terms.

BACKGROUND OF THE INVENTION

The evaluation and management of long term diversified investment and asset portfolios can be a daunting task. Accordingly, a number of methods and strategies have been developed to help in the optimization and characterization of the risk and return attributes of investment alternatives. One longstanding method that has demonstrated success as a portfolio management tool is the mean-variance optimization procedure developed by Dr. Harold Markowitz over 40 years ago.

Dr. Markowitz's method assumes investment returns in an array of asset classes over a given fixed time period follow a multi variate probability distribution with finite expected value vector and covariance matrix. The method then seeks to combine the asset classes in linear combination so as to achieve the singly-dimensioned probability distribution of investment returns with the maximum expected value for a given standard deviation (or the minimum standard deviation for a given expected value). The method of optimization is known as quadratic programming. Dr. Markowitz originated a quadratic programming algorithm to solve this mean-variance optimization problem, but other quadratic programming algorithms can also be utilized.

The algorithms produce an entire curve in the plane of expected return vs. standard deviation, consisting of the maximum expected return for each standard deviation. This curve has come to be known as the "efficient frontier," and the linear combinations of assets representing the points on the frontier as "efficient portfolios."

Given this efficient frontier of investment asset combinations, the conventional method of optimizing a portfolio for a particular investor's risk preference and displaying the risk and return characteristics of the alternative portfolios is as follows:

First, a heuristic method is applied to determine the standard deviation of the investment return distribution corresponding to the investors risk preference. The method frequently employs a questionnaire assessment of the investor's general attitude toward risk, in which the key question addresses the investor's preferred risk posture in terms such as "very conservative," "moderately conservative," "moderately aggressive," "aggressive," "very aggressive," etc.

Given the standard deviation inferred from the investor's questionnaire response, the point on the efficient frontier with that standard deviation is selected as the optimal portfolio. In the course of the risk preference assessment process, or after the investor's risk preference is assessed and the optimization procedure is performed as described above, the investor is shown exhibits characterizing the relationship between risk and return. Frequently central among these exhibits is the efficient frontier itself, displayed in the plane of expected return vs. standard deviation. The exhibit is intended to show how expected return increases as risk increases.

However, practical embodiments of this methodology are deficient since the method of determining risk preference is not specific to the investor's particular programmatic investment goals. Furthermore, standard deviation is an imperfect measure of risk and the rates of return used in framing the expectation of investment results are most often stated without accounting for the effect of taxes, expenses, fees, and inflation, thus promoting unrealistically high expectation. Other problems arise with this prior art methodology where an investor holds both taxable and tax-deferred investment accounts, since the methodology lumps them together rather than producing an optimal allocation to each account. Finally, the efficient frontier as a display technique to exhibit the relationship between risk and return tends to imply that return will be higher at higher levels of risk, without also clearly indicating that the probability of lower returns can be higher at higher risk levels.

Thus it is desirable to have system for optimizing a portfolio for a particular investor's risk preference and displaying the risk and return characteristics of the alternative portfolios without the corresponding deficiencies of prior art methods.

SUMMARY OF THE INVENTION

The present invention is a computer-implemented system and method to create an optimal investment plan given wealth goals stated in probabilistic form, and to display the resulting probability distributions of wealth accumulations at future times. Creation of the investment plan includes simultaneous optimization of two allocations, the allocation between current spending and current investment (equivalently, between current spending and future spending) and the allocation of investments to the major asset classes.

Wealth goals are stated in the form of a target scenario and fallback scenario. The target scenario, comprising the desired result, encompasses a plan of net savings, accumulating to a specified target wealth goal at a specified future date. The fallback scenario encompasses a more modest plan than the target, including possibly higher net saving, lower future wealth, and/or later date of accumulating the future wealth. The fallback scenario quantifies the worst-case acceptable result given a low, though not zero, probability of occurring, thus serving to place an upper bound on the level of risk that can be taken in pursuit of the target.

Required probabilities of achieving the target and fallback scenarios are set by the investor. The required probability of achieving the fallback is necessarily higher than the required probability of achieving the target, and is set at a high level to ensure reasonable certainty of no worse than the fallback result. Required rates of return on investment are then calculated for the target and fallback scenarios. In the calculation of required rates, wealth accumulation is reduced by taxes, expenses, fees and inflation. A probabilistic model of multi-asset investment returns commonly used in the industry is then applied, mathematically called a diffusion process with means equal to a constant vector times time period t and variances determined by a constant covariance matrix times time period t. The unique investment allocation to the major asset classes is found that meets the following criteria: first, if any allocation achieves the required fallback rate of return with at least the required probability, then among those allocations that satisfy this criterion the unique one with the maximum probability of achieving the required target rate of return is found; second, if no allocation achieves the required probability of the fallback rate of return, then the allocation is selected that maximized this probability, though less than the required probability. Where the investment portfolio is divided between taxable and tax-deferred accounts, investment asset allocations are optimized simultaneously for the two account categories.

If the required probabilities of achieving the target and fallback scenarios cannot be satisfied, the scenarios themselves are altered in an iterative process until the investor arrives at a set of realistic goals that can be achieved by the optimal asset allocation with the required probabilities.

Once this set of wealth goals has been arrived at, probability distributions of wealth accumulation at future times are constructed and displayed in formats showing probabilities of various outcomes. It is assumed that the probability distributions of the logarithms of wealth at specified future times are normal, with the target plan of net saving occurring when the investment return is equal to the required rate of return for the target scenario, and the fallback plan of net saving occurring at the 95th percentile of the probability distribution. Thus, the calculations of probability distributions of wealth accumulation incorporate the fact that the saving/spending allocation at any time is dependent on the results of investment to that time.

It is accordingly an object of the present invention to overcome the limitations of the known art and to provide a method that tailors the appropriate risk/return relationship to the investor's specific investment goals.

It is further an object of this invention to frame the future results of investment in dollar terms in which the dollar amounts are net of taxes, expenses, fees and inflation.

It is further an object of this invention to display the results in terms of the most relevant measure of risk, which is the probability of failure to meet specified dollar goals.

BRIEF DESCRIPTION OF THE DRAWINGS

Other objects, features, and advantages of the present invention will become more fully apparent from the following detailed description of the preferred embodiment and the accompanying drawings, in which.

DETAILED DESCRIPTION OF A PREFERRED EMBODIMENT

The invention is now described with reference to the accompanying figures.

Figure 1:
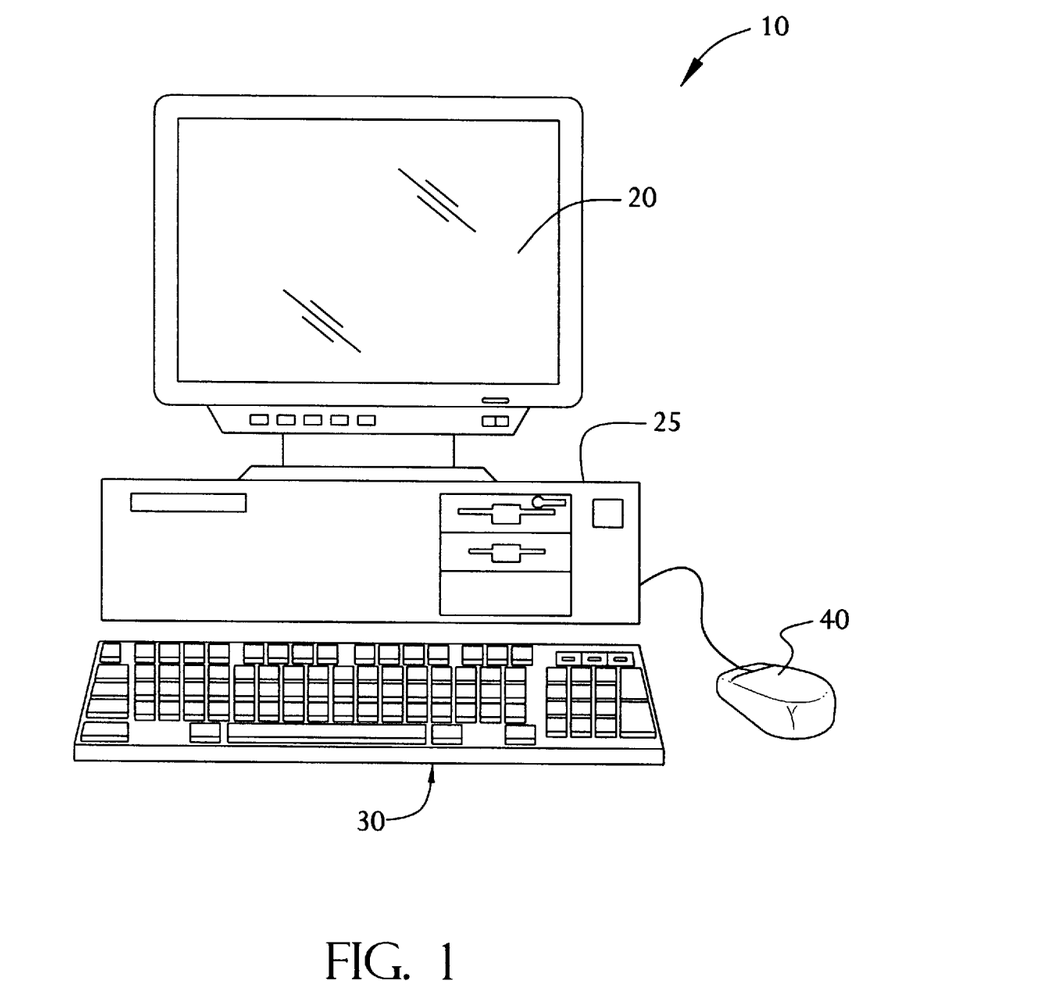
FIG. 1 is a diagrammatic representation of the computer system which implements a method used to arrive at the optimal investment allocation together with a desirable goal structure.

The present invention is a system and method for characterizing and optimizing an investment plan, including the asset allocation decision and the determination of future goals and net contribution schedules. The system uses a personal computer 10 as shown in FIG. 1. The computer 10 comprises a display having a screen 20 and further includes a number of standard components housed within a casing 25 including disk drives, memory, central processor, peripheral card, etc. Math co-processors or other similar accelerators may also be utilized to enhance computation ability. Additionally, input devices such as a keyboard 30 and mouse input device 40 are used. Alternatively, input devices such as touch screens, digitizing pads, and trackball devices may be used. The computer is designed to operate in a window-based operating system to enhance ease of usability and for the display of graphical data.

Figure 2:
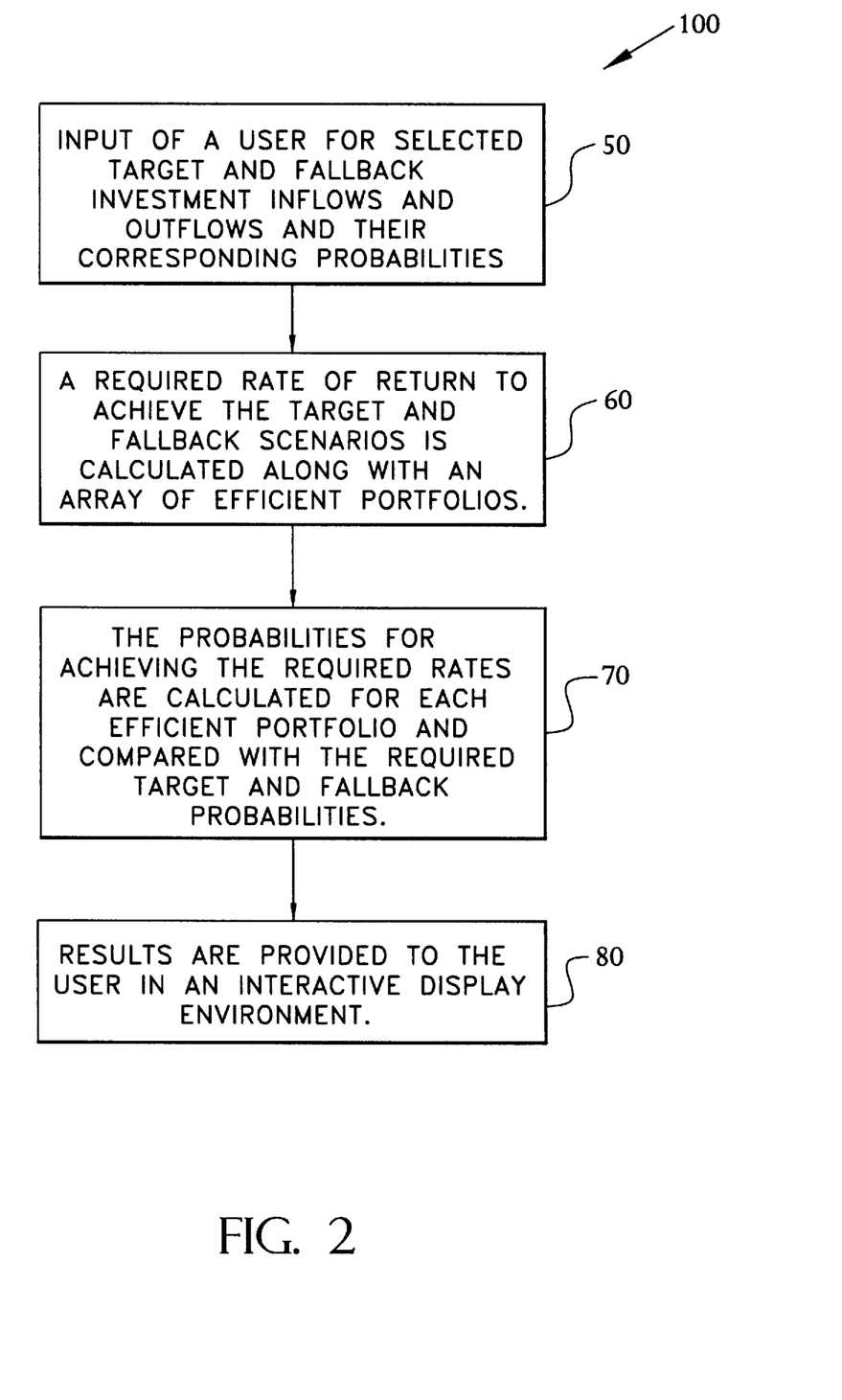
FIG. 2 is a flow chart of the system and method used to arrive at the optimal investment allocation together with a desirable goal structure.

Referring to FIG. 2, there is shown generally a block diagram of a system and method 100 which includes the processes and computer-based interactive display techniques for characterizing and optimizing an investment plan, including the asset allocation decision and the determination of future goals and net contribution schedules. The system first provides for input of a user for selected target and fallback investment inflows and outflows and their corresponding probabilities. Step 50. A required rate of return to achieve the target and fallback scenarios is calculated along with an array of efficient portfolios. Step 60. The probabilities for achieving the required rates of return as previously determined are then calculated for each efficient portfolio and compared with the required target and fallback probabilities. Step 70. Once a match is made the results are provided to the user in an interactive display environment. Step 80.

Figure 3A:
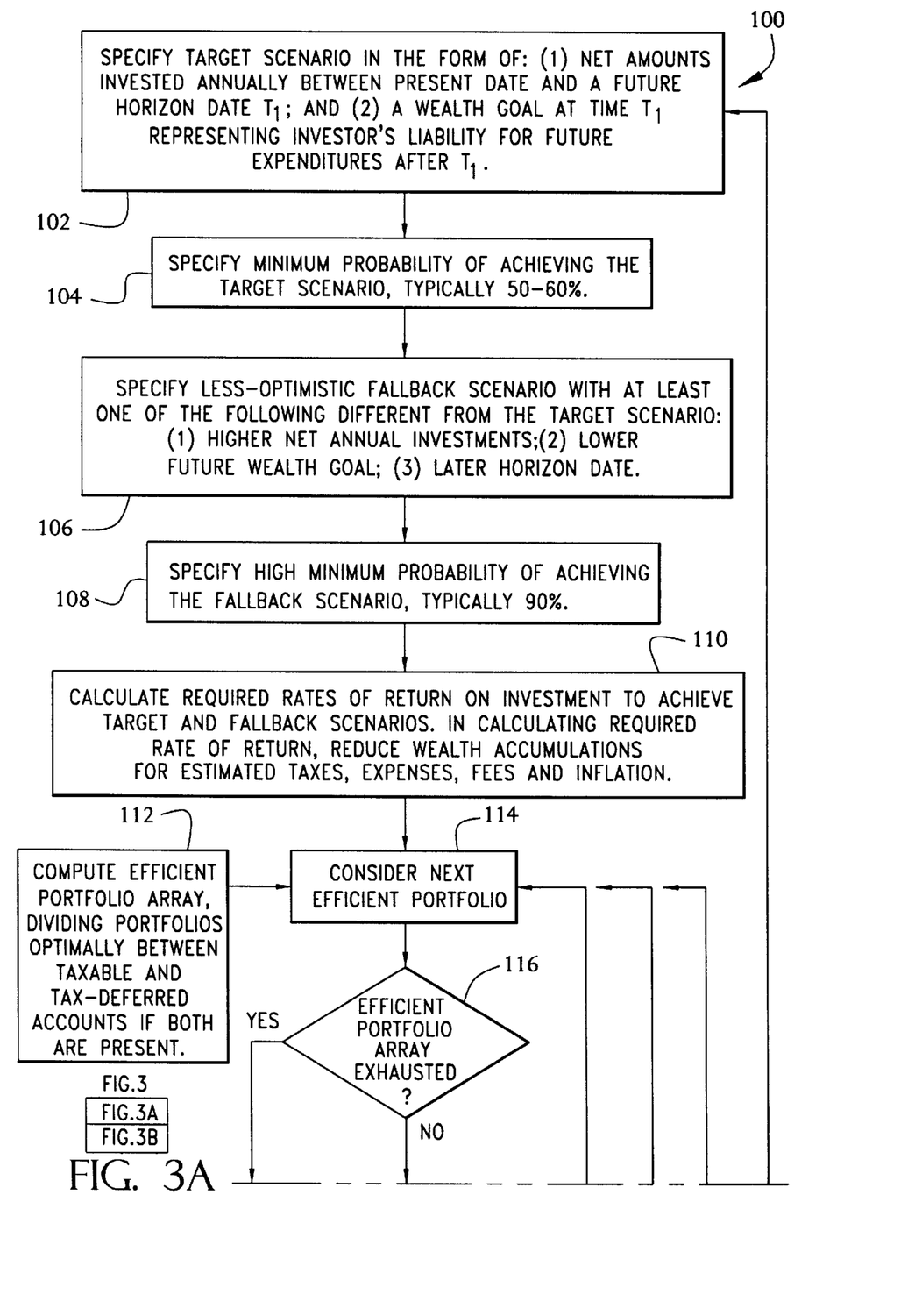
FIG. 3 is a more detailed flow chart of the system and method used to arrive at the optimal investment allocation together with a desirable goal structure as shown in FIG. 2.
Figure 3B:
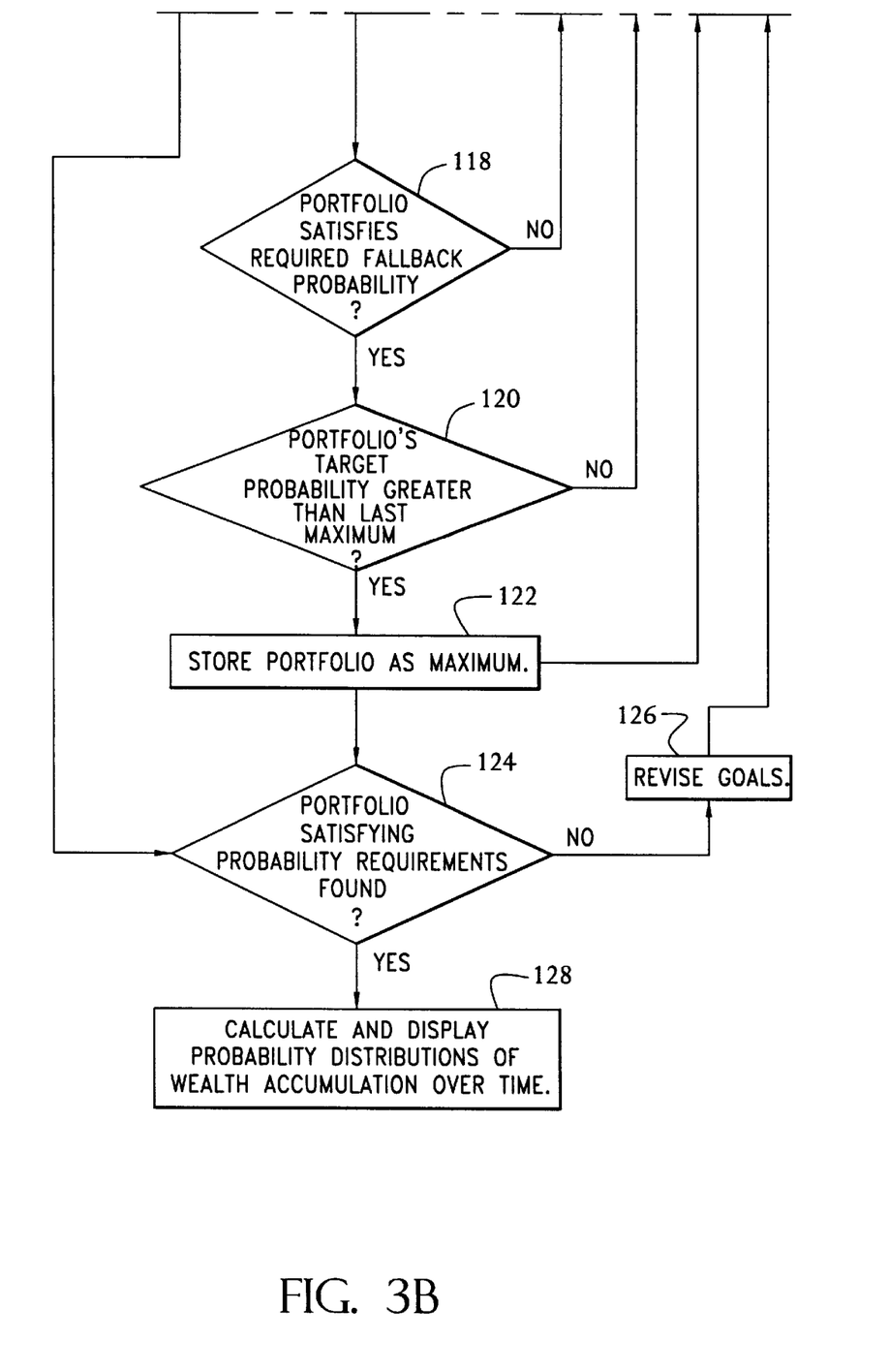

Referring to FIG. 3, there is shown in more detail a block diagram of a system and method 100 which includes the processes and computer-based interactive display techniques for characterizing and optimizing an investment plan, including the asset allocation decision and the determination of future goals and net contribution schedules.

As a preliminary step, an investor formulates a tentative set of goals stated in the form of a target scenario. Step 102. This target scenario is in the form of (1) net amounts invested annually between the present date and a future horizon date $T_1$ and (2) a wealth goal at time $T_1$ representing inventor's liability for future expenditures after $T_1$. Basically, the investor is formulating a desired set of cashflows from a present date to the future horizon date. The collection of amounts invested can be accumulated from a number of sources including savings, retirement plans, inheritances, gifts and securities investments.

Next, the investor provides a minimum probability of achieving the target scenario, typically 50–60% is then specified. Step 104. In the preferred embodiment, the minimum probability of the target scenario is set to a default of 50%.

Next, the investor formulates a fallback scenario, together with required minimal probabilities of realizing this scenario. Steps 106, 108. The required probability of achieving the fallback is necessarily higher than the required probability of achieving the target, and is set at a high level to ensure reasonable certainty of no worse than the fallback result. In the preferred embodiment, the minimal probability of the fallback scenario is set to a default of 90%. The fallback scenario differs from the target scenario in at least on of the following categories: (1) higher net annual investments; (2) lower future wealth goal; and/or (3) later horizon date.

In the general case, "the investor" is any person or entity capable of stating investment goals as probabilities of achieving specified future levels of wealth accumulation at specified future horizon dates. These future levels of wealth accumulation may be derived as present values of future spending levels planned to occur subsequent to the horizon dates. In the latter case the future wealth accumulation goals may be seen to represent liabilities for subsequent outlay requirements. Future cash flows and wealth are assumed to be in real, i.e. inflation-adjusted, terms.

The input of the target and fallback scenarios and corresponding probabilities is accomplished by virtue of a standard input screen on the computer. By a series of windows or text based prompts, the investor provides numerical inputs to satisfy the required target and fallback information. Input can be performed manually by keyboard or via the mouse device which can be used to scroll through varying options provided to the investor.

For each of the two scenarios, a minimum required rate of return to achieve the goal is calculated. Step 110. The standard rate of return r is the solution to the equation $f(r)=0$ where $f(r)$ is given by the equation:

$$f(r) = V_o(1+r)^n + \sum_{i=0}^{n-1} C_i(1+r)^{n-i} - V_n$$

where $V_o$ is the asset value at the start of an n-year period $C_i$ is the net addition (contribution) to assets at the beginning of the i'th year $V_n$ is the required asset value at the end of the n-year period In the calculation of the required rates, a reduction for taxes, expenses, fees and inflation is taken. This rate of return is derived from the scenario's scheduled net cash inflows and future wealth accumulation goal, using the standard Newton-Raphson numerical solution method. The standard Newton-Raphson method is an iterative method for generating a sequence of approximations to a solution of a given equation. In theory, this sequence of approximations should converge to the root of an equation. The Newton-Raphson formula is given by:

$$x_n = x_{n-1} - \frac{f(x_n - 1)}{f'(x_n - 1)}.$$

This results in the required real rate of return after all taxes, expenses, fees and inflation.

Employing the standard mean-variance optimization procedure, an array of efficient portfolios is obtained. Step 112. Each member of the array of efficient portfolios contains separate combinations and apportionments of the asset classes depending the each respective structure of the portfolio. Where the investor holds both taxable and tax-deferred accounts, each of these portfolios is then reallocated in an optimal manner between taxable and tax-deferred account categories, given the investor's tax rates and assumptions of income yields and turnover rates for the asset categories.

The probabilities of achieving the required rates of return over the horizon period are than calculated for each efficient portfolio and compared with the required target and fallback probabilities. Steps 116–120. Among those portfolios for which the required fallback probability is achieved, if any, that portfolio is selected which maximized the probability of achieving the target. If, for this portfolio, both target and fallback probability requirements are satisfied, Steps 118, 120, then this portfolio is the sought-for optimal qualified portfolio to achieve the inventor's goals. Step 122. If no efficient portfolio achieves the required fallback probability, that efficient portfolio is selected which maximizes the fallback probability, though less than the required fallback probability. Step 114.

In the determination of a qualified or desired portfolio, a probabilistic model of multi-asset investment returns commonly used in the industry is applied. This model is mathematically called a diffusion process with means equal to a constant vector times time period t and variances determined by a constant covariance matrix times time period t. The unique investment allocation to the major asset classes is found that meets the following criteria: first, if any allocation achieves the required fallback rate of return with at least the required probability, then among those allocations that satisfy this criterion the unique one with the maximum probability of achieving the required target rate of return is found; second, if no allocation achieves the required probability of the fallback rate of return, then the allocation is selected that maximized this probability, though less than the required probability. Where the investment portfolio is divided between taxable and tax-deferred accounts, investment asset allocations are optimized simultaneously for the two account categories.

It is anticipated that in the typical case, no portfolio will be found initially to satisfy the probability requirements of achieving the goals. In such a case the goals will be revised iteratively until an optimal portfolio can be found to meet the required probabilities.

Figure 4:
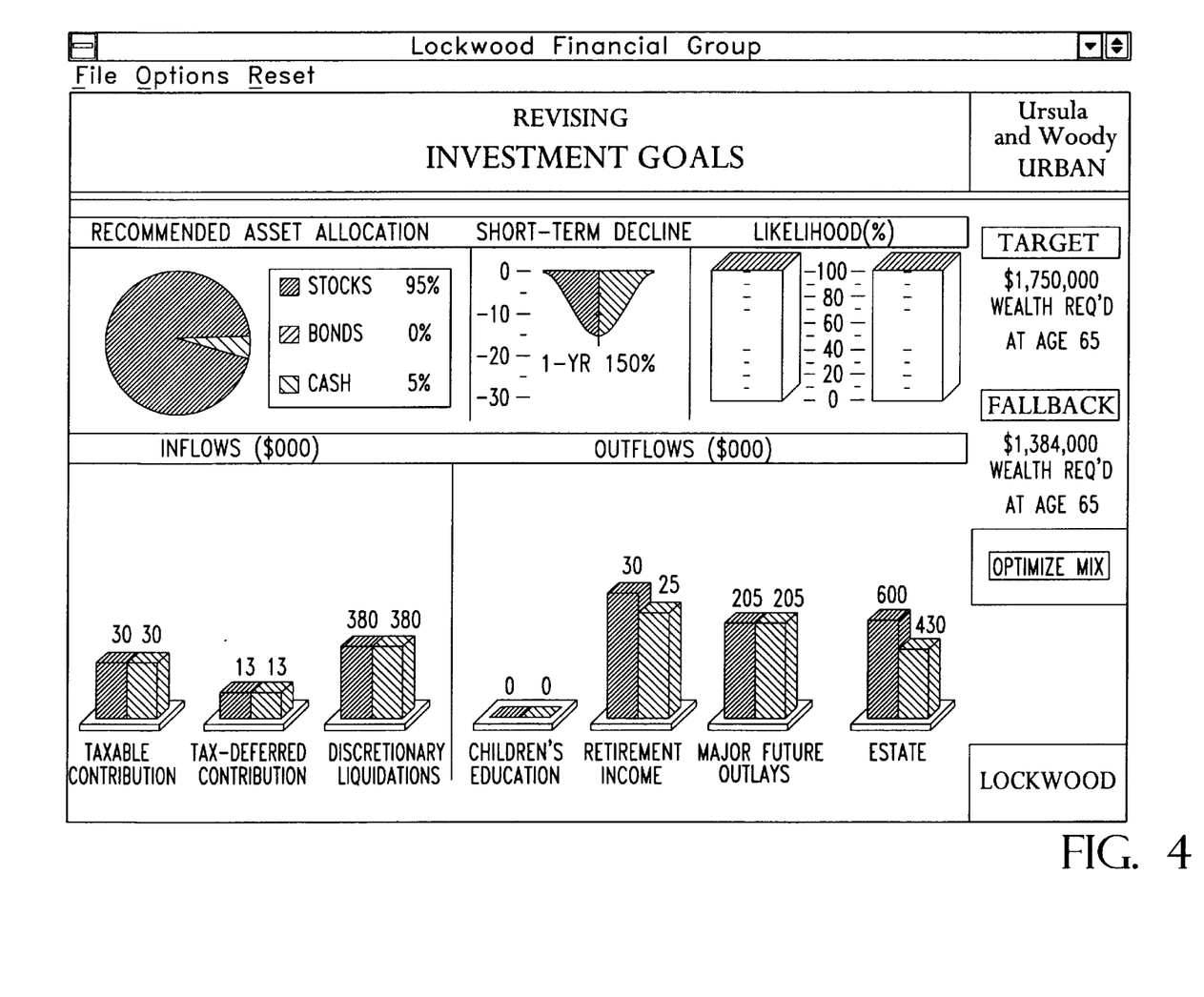
FIG. 4 is a static image of an interactive graphical computer screen used to arrive at a revised goal structure and optimal allocation, for the particular case of an individual investor.

Referring to FIG. 4, there is shown an interactive computer-based graphical embodiment of the interactive process of goal revision and portfolio optimization. In this embodiment, the investor is an individual formulating an investment plan to provide for children's education, retirement income, a bequest, and other major future expenditures. The horizon date for each scenario is generally the investor's retirement age, which may be different for the two scenarios. The optimum allocation for the initial formulations of the scenarios is initially displayed on the screen, together with the probabilities (i.e. likelihoods) of achieving the goals with this optimal investment allocation. The wealth goals are calculated as the present-value liabilities, as of the horizon dates, for the future planned withdrawals from the investment account for retirement income, bequest, and any other post-horizon expenditures.

In the event that the probabilities of achieving the goals do not satisfy the target and fallback probability requirements, the computer system operator may alter the scenarios by moving the on-screen bars via the keyboard or preferably with a mouse or other similar tracking device. Each time a scenario's cash inflow and outflow plan is altered by a bar movement the computer system automatically reoptimizes the mix and recalculates the probabilities of achieving the target and fallback goals. The worst-case (99th percentile) short-term percentage decline in assets is also displayed for each asset allocation, and may be manipulated by mouse movements to limit the allowable allocation to those portfolios with short-term volatility below a desired maximum. In this particular embodiment, the asset allocation is performed across ten asset classes, which are than aggregated into their stock, bond and cash categories for display purposes.

By the means of scenario and goal alteration made available by this interactive graphic the computer system operator is enabled to alter the cash inflows and outflows and the goals of each scenario until acceptable and realistic target and fallback goals are arrived at, with the required probabilities of achievement.

Figure 5:
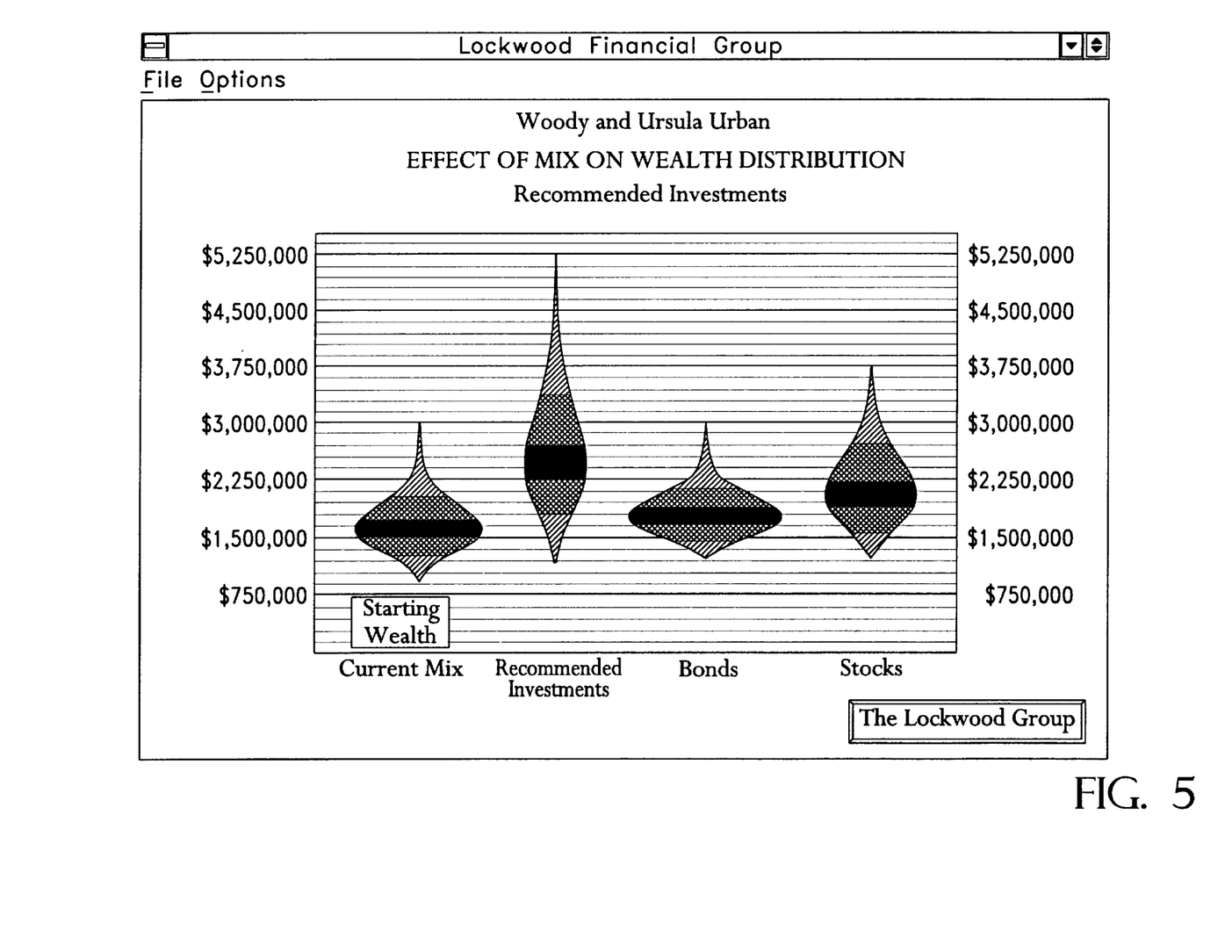
FIG. 5 is a static image of the interactive graphical computer screen displaying a "teardrop" graphical representation used to compare probability distributions of wealth accumulations at a given time.
Figure 6:
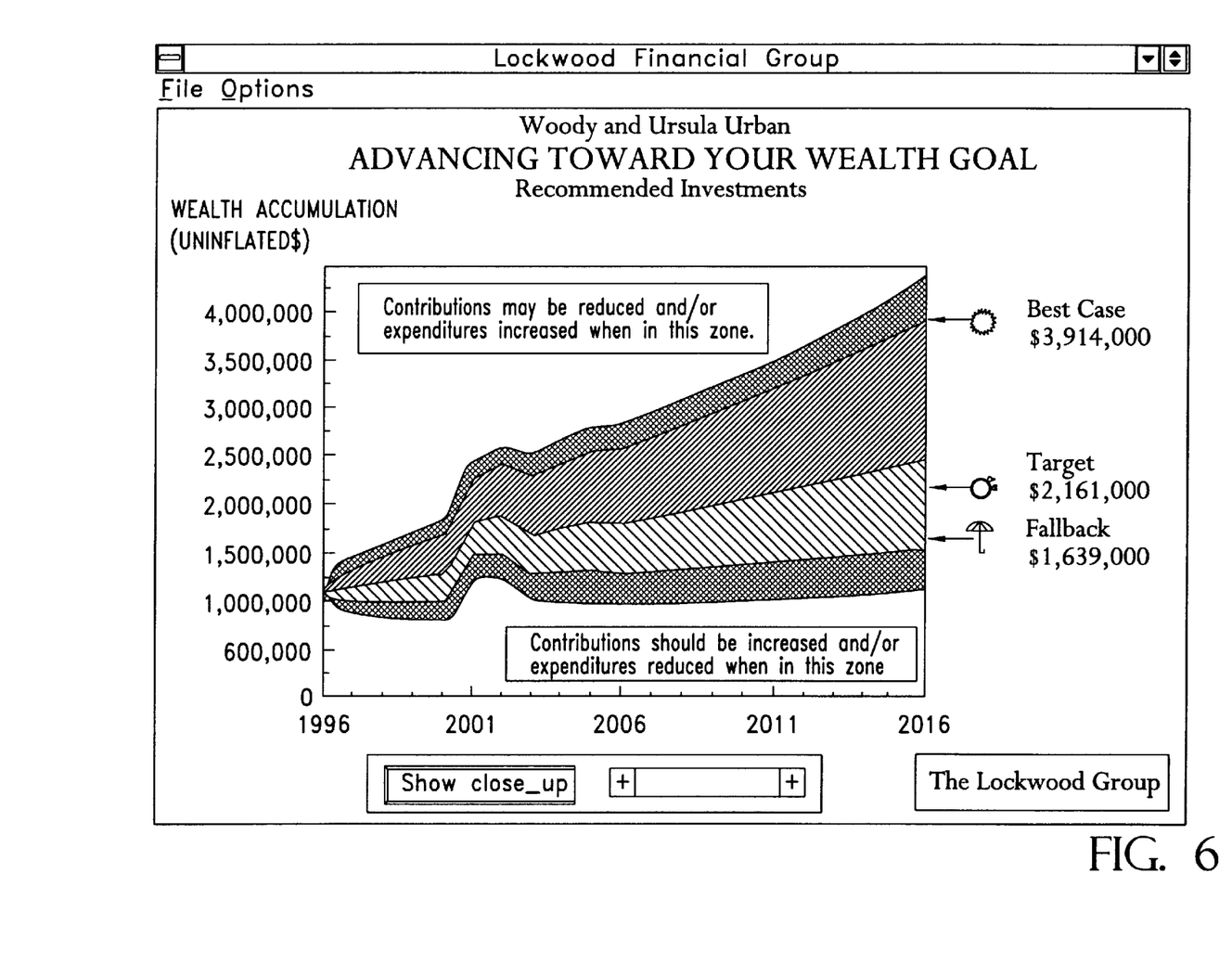
FIG. 6 is a static image of the interactive graphical computer screen displaying the probability distributions for a single optimally-allocated portfolio across time.

FIGS. 5 and 6 show two different formats used to display the probabilities of the spectrum of possible wealth accumulations at future times. FIG. 5 is the "teardrop" display in which the teardrop shapes represent probability distributions of wealth accumulation at the horizon, with different asset allocation strategies. Each teardrop is a conventional lognormal probability distribution which has been rotated 90 degrees and reflected about the wealth axis. Thus, the width of the teardrop shape at any wealth level is proportional to the probability of attaining exactly that wealth level.

In this embodiment, a mouse click on any point or cursor placement within the teardrop causes a text box to appear, not shown, showing the probability of achieving or exceeding the wealth accumulation to which the mouse cursor points. As previously stated, the probability distributions are calculated by assuming that logarithms of wealth at specified future times are normally distributed, with the target plan of net saving occurring when the investment return is equal to required rate of return for the target scenario, and the fallback plan of net saving occurring at the 95th percentile of the probability distribution. Thus, the calculations of probability distributions of wealth accumulation incorporate the fact that the saving/spending allocation at any time is dependent on the results of investment up to that time.

FIG. 6, the "advancing toward your goal" cone exhibit, displays the same probability distributions represented by the teardrops except that they are displayed for a single optimally-allocated portfolio across time. The top line of the cone is the fifth percentile of the probability distribution of wealth accumulation at each future time, the second-to-top line is the tenth percentile, the middle line is the 50th percentile, the next-to-lowest line is the 90th percentile, and the lowest line is the 99th percentile. In the computer system embodiment, as with the teardrops, a mouse click on any point within the cone causes a text box to appear showing the probability of achieving or exceeding the wealth accumulation at that wealth level and future time to which the mouse cursor points. Anomalies or "kinks" in the cone occur when sporadic large net cash inflows or outflows occur, such as during the college education of children or the planned future exercise of corporate stock options.

Persons skilled in the art may recognize other steps that can be added to the embodiment described above. Similarly, persons skilled in the art may recognize other alternatives to the steps or equations disclosed herein.

What is claimed is:

1. A computer implemented method for generating an optimal investment plan in probabilistic form and for displaying resulting probability distributions, the method utilizing a computer having a processor programmed to electrically process input data and output data, the processor being electrically connected to a keyboard and a visual display screen, the method comprising the steps of:

inputting target and fallback scenarios and required probabilities;

computing rate of return values responsive to the target and fallback scenarios;

generating an efficient portfolio array;

computing probabilities for the efficient portfolio array responsive to the rate of return values;

comparing iteratively the array probabilities so that the target and fallback scenario probabilities are satisfied to select a qualified portfolio; and providing a graphical representation in a teardrop graph format of the resulting probability distributions.

2. The method of claim 1 wherein the rate of return is calculated by the following formula:

$$f(r) = V_o(1+r)^n + \sum_{i=0}^{n-1} C_i(1+r)^{n-i} - V_n$$

where $V_o$ is the asset value at the start of an n-year period, $C_i$ is the net addition (contribution) to assets at the beginning of the i'th year, and $V_n$ is the required asset value at the end of the n-year period.

3. The method of claim 1 wherein the probability for the fallback scenario is higher than the probability for the target scenario.

4. The method of claim 1 wherein the probability for the target scenario is 50% and the probability for the fallback scenario is 90%.

5. The method of claim 1 wherein the graphical representation is provided for a single optimally-allocated portfolio across time.

6. A system for generating an optimal investment plan in probabilistic form and for displaying resulting probability distributions, the system utilizing a computer having a processor programmed to electrically process input data and output data, the processor being electrically connected to a keyboard and a visual display screen, the system comprising:

data means for entering and storing in the computer target and fallback scenarios and associated required probabilities;

means for computing rate of return values responsive to the first data means;

means for generating an efficient portfolio array;

means for computing probabilities for the efficient portfolio array related to the rate of return values;

comparison means for iteratively comparing the array probabilities so that the target and fallback scenario probabilities are satisfied and an optimum efficient portfolio is selected; and display means for providing a graphical representation in a teardrop graph format of the resulting probability distributions.

7. The system of claim 6 wherein the rate of return is calculated by the following formula:

$$f(r) = V_o(1+r)^n + \sum_{i=0}^{n-1} C_i(1+r)^{n-i} - V_n$$

where $V_o$ is the asset value at the start of an n-year period, $C_i$ is the net addition (contribution) to assets at the beginning of the i'th year, and $V_n$ is the required asset value at the end of the n-year period.

8. The system of claim 6 wherein the probability for the target scenario is 50% and the probability for the fallback scenario is 90%.

9. The system of claim 6 wherein the probability for the fallback scenario is higher than the probability for the target scenario.

10. A system for generating an optimal investment plan in probabilistic form and for displaying resulting probability distributions, the system comprising:

data means for entering and storing in a computer target and fallback scenarios and required probabilities;

means for computing rate of return values responsive to the first data means;

means for generating an efficient portfolio array;

means for computing probabilities for the efficient portfolio array related to the rate of return values;

comparison means for iteratively comparing the array probabilities so that the target and fallback scenario probabilities are satisfied and an optimum efficient portfolio is selected; and display means for providing a teardrop graphical representation of the resulting probability distributions.

11. The system of claim 10 wherein the rate of return is calculated by the following formula:

$$f(r) = V_o(1+r)^n + \sum_{i=0}^{n-1} C_i(1+r)^{n-i} - V_n$$

where $V_o$ is the asset value at the start of an n-year period, $C_i$ is the net addition (contribution) to assets at the beginning of the i'th year, and $V_n$ is the required asset value at the end of the n-year period.

12. The system of claim 10 wherein the probability for the target scenario is 50% and the probability for the fallback scenario is 90%.

13. The system of claim 10 wherein the probability for the fallback scenario is higher than the probability for the target scenario.

14. The system of claim 10 wherein the graphical representation is provided for a single optimally-allocated portfolio across time.

* * * * *